US005265161A

United States Patent [19]

Rodriguez

[11] Patent Number: 5,265,161

[45] Date of Patent: Nov. 23, 1993

[54] PROCESS AND DEVICE FOR ACTIVATING A CHIP CARD

[75] Inventor: José I. Rodriguez, Villingen-Schwenningen, Fed. Rep. of Germany

[73] Assignee: Deutsche Thomson-Brandt GmbH, Villingen-Schwenningen, Fed. Rep. of Germany

[21] Appl. No.: 896,531

[22] Filed: Jun. 10, 1992

Related U.S. Application Data

[63] Continuation of PCT/EP90/01845, Nov. 3, 1990.

[30] Foreign Application Priority Data

Nov. 7, 1989 [FR] France ................................ 89 14567

[51] Int. Cl.[5] .......................... G06K 7/06; H04L 9/00

[52] U.S. Cl. ........................................ 380/23; 380/10; 235/441; 235/492

[58] Field of Search ............................ 380/10, 16, 23; 235/380, 492, 441

[56] References Cited

U.S. PATENT DOCUMENTS

| | | | |
|---|---|---|---|
| 3,890,461 | 6/1975 | Vogelman et al. | 380/16 |
| 4,001,550 | 1/1977 | Schatz | 235/492 |
| 4,795,898 | 11/1989 | Berwstein et al. | 235/380 |
| 4,880,097 | 11/1989 | Speas | 235/492 |
| 5,105,074 | 4/1992 | Nara | 235/492 |
| 5,128,523 | 7/1992 | Diehl et al. | 235/441 |
| 5,149,945 | 9/1992 | Johnson | 235/380 |

FOREIGN PATENT DOCUMENTS

| | | |
|---|---|---|
| 0031987 | 7/1981 | European Pat. Off. . |
| 0314871 | 6/1988 | European Pat. Off. . |
| 5785109 | 11/1980 | Japan . |
| 5785111 | 11/1980 | Japan . |
| 5785110 | 11/1990 | Japan . |

*Primary Examiner*—Salvatore Cangialosi

*Attorney, Agent, or Firm*—Joseph S. Tripoli; Eric P. Herrmann; Robert D. Shedd

[57] ABSTRACT

A system for activating an apparatus upon the insertion of a chip card into the apparatus by an authorized user includes a first control unit arranged on the chip card for providing an actuation signal when the chip card is initially inserted into the apparatus. A second control within the apparatus receiving the actuation signal and provides a triggering signal. A regulated voltage generator is responsive to the triggering signal and provides a regulated voltage to the first control unit.

8 Claims, 2 Drawing Sheets

PROCESS AND DEVICE FOR ACTIVATING A CHIP CARD

This is a continuation of PCT application PCT/EP 09/01845 filed Nov. 3, 1990 by Jose I. Rodriguez and titled "Process And Device For Activating A Chip Card".

This invention is directed to a process for activating a chip card and to a device useful in employing the inventive process.

A "chip card" typically has a rectangular configuration and includes an integrated circuit having contacts. The integrated circuit is arranged at a particular location on the surface of the "chip card". Such a device has a number of applications, for example, cheque or credit card, telephone, pay TV, and many others. Such cards enable the owners to access a service or to operate a particular apparatus. In particular, such a card can be used in a pay TV system in which a coded television signal is received through a decoding device which regenerates a decoded signal when the decoding device is connected with a chip card which contains authorization data. The device for receiving and decoding the signals exchanges data with the circuit on the card to verify that the individual attempting to access a particular pay TV program is authorized to receive the broadcast. This exchange of information (dialog) between the decoder contains, in particular, a programming d.c. voltage generator in order to write information into the integrated circuit in a non-volatile manner. There are various types of "chip cards" and each type corresponds to a programming voltage.

It is an object of the invention to provide a reliable method for activating a chip card and to provide a device which is simple to realize and can be used as part of an apparatus which is fully functional only when used in conjunction with an active chip card.

According to the invention, a control unit of an apparatus, for example a decoding device, receives a signal from a control unit of a chip card connected with the apparatus. The value of the signal determines an activation voltage. On the basis of the signal, the control unit of the apparatus triggers further stages which deliver the necessary activation voltage to the chip card. The activation voltage, with the desired voltage value, renders it possible for the chip card to be utilized for further steps, for example, for decoding information.

An embodiment of the invention defines the chronological sequence for the application of supply voltages to the control units. Thus, the control unit present in the apparatus is supplied with the necessary initial supply voltage immediately after the apparatus is switched on. When the presence of a chip card is detected, the control system is supplied with a second supply voltage which, relative to the first supply voltage, is delayed.

A preferred embodiment of the inventive device contains a d.c. voltage generator which generates the activation voltage required for the chip card in a simple manner. The d.c. voltage generator is characterized by the fact that it contains a generator for a regulated voltage, followed by an ohmic voltage divider which has resistors connected in parallel in one branch, at least one of the resistors is connected in series with a switch which is actuated in dependence upon the d.c. voltage to be supplied. The voltage made available through the voltage divider can be directly used to activate the card. However, in an advantageous configuration, the output voltage of the voltage divider represents a desired voltage which controls a regulating circuit, for example with a ballast transistor, which supplies the programming with a current level sufficient for the desired operation.

Before the preferred embodiment is more closely described, it should be pointed out that the blocks illustrated individually in the figures serve merely for a better understanding of the invention. Normally, single or several blocks are combined to form units. These can be realized in integrated or hybrid technology or as a program-controlled microcomputer or, respectively, as a part of a program suited for its control. Also, the devices and elements contained in the individual stages can also be realized separately.

Figure 1:
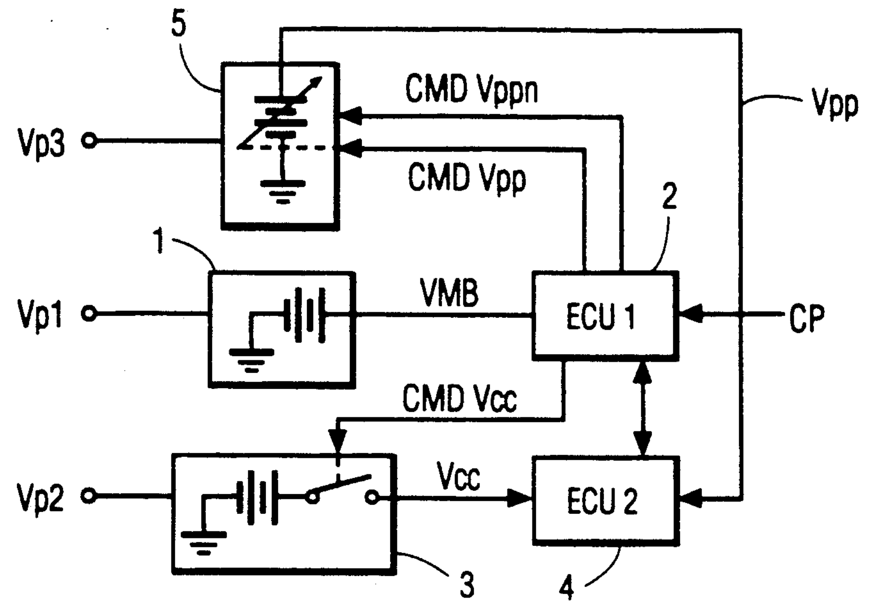
FIG. 1 is a preferred embodiment of the inventive device.

In FIG. 1, a first d.c. voltage regulator 1 receives a first unregulated d.c. voltage Vp1 and provides a first regulated d.c. voltage VMB to a first electronic control unit 2 (ECU1) which is assigned to an apparatus, for example, a decoding device. Also, a second d.c. voltage generator 3 receives a second unregulated d.c. voltage Vp2 and which supplies a second regulated d.c. voltage Vcc to a second electronic control unit 4 (ECU2) which is assigned to a chip card, which is not illustrated. This chip card must be directly or indirectly connected to the apparatus in order to perform decoding procedures. A d.c. voltage generator 5 receives a third unregulated d.c. voltage Vp3 and supplies a third regulated d.c. voltage Vpp, hereinafter also called the programming voltage, to the second electronic control unit 4.

The first electronic control unit 2 receives a signal CP which assumes the value 1 when the connection between the chip card and the apparatus exists, and also an activation signal from the second electronic control unit 4. The first electronic control unit 2 sends a first control signal CMDVcc to the second voltage regulator 3, a second and third control signal CMDVpp and CMMDVppn respectively to the d.c. voltage generator 5, as well as a further signal to the second electronic control unit 4.

Figure 2:
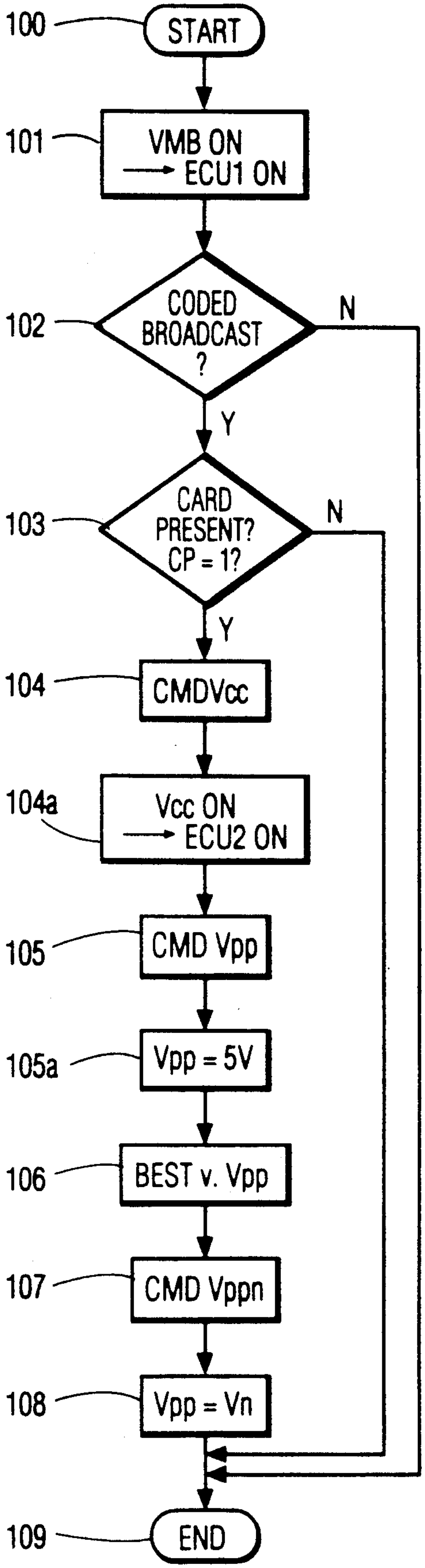
FIG. 2 is a flow chart of a preferred embodiment of the inventive method.

The operation of the preferred embodiment shown in FIG. 1 can be understood from the flow chart shown in FIG. 2. The process starts with step 100 in which the apparatus is switched on and the unregulated voltages Vp, corresponding to Vp1, Vp2, Vp3 are applied. The first voltage regulator 1 generates the regulated d.c. voltage VMB in step 101 and the first electronic control unit 2 is switched on.

After electronic control unit 2 is turned on, with the aid of a microprocessor, which first performs a so-called RESET routine, step 102 is entered in which a check is made to verify whether a coded broadcast is being received.

Step 103 is used to establish that a connection between the chip card and the apparatus has been made (CP=1), and, after the time required to turn control unit 2 on has expired, the control signal CMDVcc is supplied, in step 104, to the second voltage regulator 3. The second voltage regulator 3 responds to the CMDVcc signal and provides the regulated d.c. voltage Vcc to the second electronic control unit 4 and turn the unit on, as indicated at step 104*a*. The control signal CMDVpp is supplied to the d.c. voltage generator 5 by the first electronic control device 2 in step 105 and the generator 5 provides the voltage Vpp to control unit 4, in this example at a fixed value of 5 V, as indicated at step 105*a*.

In step 106, the second electronic control unit 4 supplies the first electronic control unit 2 with the activation signal which contains information on the value Vn of the programming d.c. voltage Vpp required for the activation. On the basis of the activation signal, the first electronic control unit 2 provides, in step 107, the control signal CMDVppn to the d.c. voltage generator 5. The generator 5 then provides the voltage Vpp with the desired value Vn and provides the voltage Vpp to the second electronic control unit 4 in step 108. The process comes to an end in step 109 after voltage Vpp is provided to control unit 4. Also, step 109 is directly entered when it is established in step 102 or step 103 that no coded broadcast suitable for the system is present or that no connection between chip card and apparatus (CP not equal to 1) is present.

For some versions of the preferred embodiment shown in FIG. 1, the unregulated direct voltages Vp1, Vp2, Vp3 can be identical, so that the input terminals of voltage regulators 1, 3 and direct voltage generator 5 are interconnected. Also, it is conceivable that the voltage regulator 3 can be designed in such a way that the amplitude of voltage Vcc increases with time from a predetermined initial value to a predetermined final value.

Figure 3:
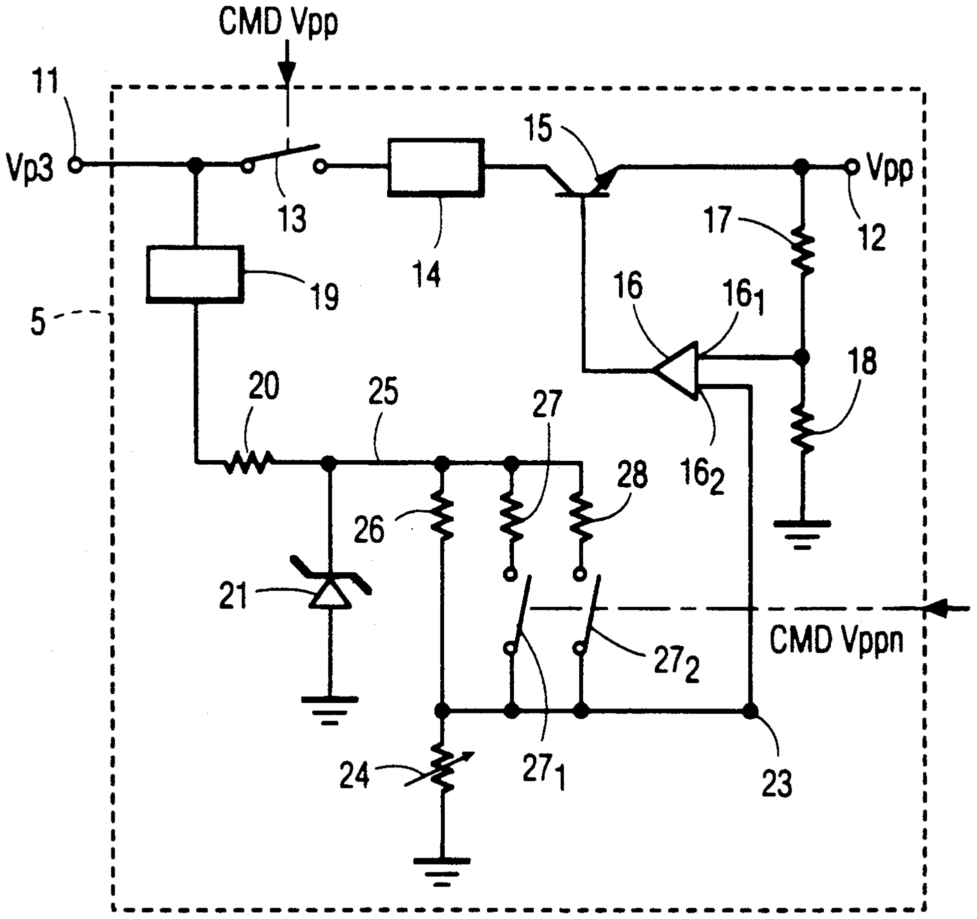
FIG. 3 is a preferred embodiment of a generator used to generate the activation direct voltage for the preferred embodiment of FIG. 1.

A preferred embodiment of the d.c. voltage generator 5, which supplies the activation direct voltage Vpp, hereinafter also called the programming voltage, with desired values, is illustrated in FIG. 3.

It should be pointed out that the specified values for voltages and dimensioning of components merely characterize a preferred embodiment and do not limit the invention. The voltage generator shown in FIG. 3 consists of a d.c. voltage generator (not illustrated) which represents the main supply and deliver the unregulated d.c. voltage Vp3 of 30 V to an input terminal 11. Terminal 11 is connected to output terminal 12 of an on/off switch 13, which can be actuated by the control signal CMDVpp, a current limiter 14 and a ballast transistor 15 of the NPN type. The conductivity of ballast transistor 15 is controlled in such a way that a programming voltage Vpp appears at output terminal 12 allowing information to be written into a (not illustrated) chip card in a non-volatile manner. The programming voltage Vpp can assume one of the following values: 5 V, 12.5 V, 15 V and 21 V. The accuracy of this programming voltage is plus/minus 2.5 per cent. The ballast transistor 15 serves to adjust the voltage at output terminal 12 to the chosen value and to regulate the output voltage at output terminal 12. For voltage regulating purposes, the base of transistor 15 is connected to the output of a comparator 16. One input terminal $16_1$ of comparator 16 is connected to a voltage divider composed of resistors 17 and 18, which can be 407 and 196 kohm respectively, for example. Input terminal 16, thus receives a voltage proportional to the output voltage Vpp. The desired regulation voltage value is applied to the second input terminal $16_2$ of the comparator 16, and is the voltage value which is desired at output terminal 12.

A regulated d.c. voltage source 19, which supplies a 12 V voltage, for example, provides the desired voltage level to input terminal $16_2$. The accuracy of the desired voltage level is plus/minus 5 per cent, for this example. This voltage is transmitted via a resistor 20, having a value of 470 ohm, for example, to the terminals of a breakdown diode 21 which supplies a d.c. voltage of 6.8 V at an accuracy of plus/minus 2 per cent. A voltage divider 22, having an output terminal 23 connected to the input $16_2$ terminal of comparator 16, is parallel to the breakdown diode 21. The voltage divider 22 contains a rheostat 24 connected between output terminal 23 and ground, and a resistor 26, having a value of 6.8 kohm for example, is connected between output terminal 23 and a conductor 25 which is connected to the cathode of breakdown diode 21. Resistors 27 and 28 are connected in parallel with resistor 26. The resistors 27 and 28 are respectively connected in series with switches $27_1$ and $28_1$. The switches $27_1$ and $28_1$ are controlled by the control signal CMDVppn. The resistors 27 and 28 can have the values 1.82 kohm and 1.37 kohm respectively, for example and the accuracy of the value of these resistors can be plus/minus 1 per cent.

Depending upon the open and closed status of the switches $27_1$ and $28_1$, the parallel resistance value between output terminal 23 and conductor 25 can have different values. Three of the possible values available are: the first value when both switches $27_1$ and $28_1$ are open, the second value when switch $27_1$ is closed and switch $28_1$ is open, and the third when switch $27_1$ is open and switch $28_1$ is closed. The control of switches $27_1$ and $28_1$ is carried out through an interface (not illustrated) which receives, information on the voltage required from the chip card. Both of switches $27_1$ and $28_1$ are controlled by an output of a micro-actuator. It is conceivable and preferable that the switches $27_1$ and $28_1$ are in the form of semiconductor components, such as transistors which are voltage triggered.

In operation, comparator 16 supplies an error signal, representing the difference between the actual value of signal Vpp at output 12 and the desired value applied to input terminal $16_2$, to the base of transistor 15. The value of the signal at output terminal 12 depends on the conduction state of ballast transistor 15. The ballast transistor 15 can be replaced by other types of solid state devices, the conductivity of which can be controlled.

The circuit just described enables the generation of three d.c. voltages with the desired accuracy (plus/-minus 2.5 percent) and is very simple in construction. By increasing the number of resistors connected in parallel with resistor 26, whereby a switch is connected to each of the additional resistors, the number of voltage values, which can be delivered to output 12, may be increased. It is also possible to provide just two resistors, for example, resistors 26 and 27. In this case only two possible voltage values are available. The regulation of the value of resistor 24 enables the use of the advantageous region of the steady state characteristic of breakdown diode 21.

I claim:

1. A method of using a chip card to enable the generation of first and second supply voltages for said chip card by a control apparatus, said method comprising the steps of:

generating said first supply voltage at a first output of said control apparatus in response to said chip card being coupled to said control apparatus;

applying said first supply voltage to said chip card;

generating said second supply voltage at a second output of said control apparatus, said second supply voltage exhibiting an initial voltage level;

applying said second supply voltage at said initial voltage level to said chip card while said first supply voltage is applied to said chip card;

receiving at an input of said control apparatus a control signal from said chip card indicating a programming voltage level required for activation of said chip card;

adjusting said second supply voltage from said initial level to said programming voltage level in response to said control signal.

2. The method of claim 1 wherein said first supply voltage for said chip card is first made available a predetermined time after said control apparatus is turned on.

3. The method of claim 2 wherein said predetermined time is determined by the time required for said control apparatus to become ready for operation after turning said apparatus on.

4. The method of claim 3 wherein said adjustment of said second voltage supply level rises from said initial value to said programming voltage level during a predetermined time interval.

5. Control apparatus for providing first and second supply voltages to a chip card, said control apparatus comprising:

means for generating said first and second supply voltages;

means for applying said first supply voltage to said chip card in response to said chip card being coupled to said control apparatus;

means for applying said second supply voltage at an initial voltage level to said chip card while said first supply voltage is applied to said chip card; and means for adjusting said second supply voltage from said initial value to a programming voltage level required for activation of said chip card in response to a control signal from said chip card indicating the required value of said programming voltage level.

6. The system of claim 5 wherein said supply voltage generating means comprises a voltage regulator including a voltage divider having one branch including resistors connected at a node and a plurality of parallel branches, each of said branches including a series connection of a resistor and a switch responsive to said control signal for varying the output voltage of said voltage regulator.

7. The system of claim 6 wherein said voltage regulation means includes a comparator for comparing the output voltage of said voltage regulator with a reference voltage to regulate said output voltage.

8. The system of claim 7 wherein said voltage regulation means includes a ballast transistor responsive to said comparator for regulating the output voltage of said voltage regulation means.

* * * * *